(12) United States Patent
Chakra et al.

(10) Patent No.: US 9,380,126 B2
(45) Date of Patent: Jun. 28, 2016

(54) DATA COLLECTION AND DISTRIBUTION MANAGEMENT

(71) Applicant: International Business Machines Corporation, Armonk, NY (US)

(72) Inventors: Al Chakra, Apex, NC (US); Tim Friessinger, Boblingen (DE); Spenser E. Shumaker, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 13/897,709

(22) Filed: May 20, 2013

(65) Prior Publication Data

US 2014/0344328 A1 Nov. 20, 2014

(51) Int. Cl.
*G06F 15/16* (2006.01)
*H04L 29/08* (2006.01)

(52) U.S. Cl.
CPC ............ *H04L 67/2842* (2013.01); *H04L 67/28* (2013.01); *H04L 67/2804* (2013.01); *H04L 67/2819* (2013.01); *H04L 67/02* (2013.01); *H04L 67/303* (2013.01)

(58) Field of Classification Search
CPC . H04L 67/2804; H04L 67/28; H04L 67/2819; H04L 67/2842
USPC ........................................................ 709/203
See application file for complete search history.

(56) References Cited

U.S. PATENT DOCUMENTS

| | | | |
|---|---|---|---|
| 6,314,492 B1 * | 11/2001 | Allen ................ | G06F 17/30902 707/E17.12 |
| 6,442,654 B1 * | 8/2002 | Brock et al. .................. | 711/141 |
| 6,470,426 B2 * | 10/2002 | Burnett .......................... | 711/133 |
| 6,816,901 B1 * | 11/2004 | Sitaraman ............. | H04L 63/101 709/217 |
| 6,847,974 B2 | 1/2005 | Wachtel | |
| 2003/0041050 A1 | 2/2003 | Smith et al. | |
| 2004/0172385 A1 * | 9/2004 | Dayal ............... | G06F 17/30501 |
| 2005/0120021 A1 | 6/2005 | Tang et al. | |

(Continued)

FOREIGN PATENT DOCUMENTS

WO 2010036336 A3 4/2010

OTHER PUBLICATIONS

"HTTP Data Collector", Open NMS, last modified: Dec. 28, 2012. www.opennms.org/wiki/HTTP_Collector.

(Continued)

*Primary Examiner* — Richard G Keehn
(74) *Attorney, Agent, or Firm* — Robert C. Bunker; Joseph Petrokaitis

(57) ABSTRACT

According to embodiments of the invention, a method, a computer readable storage medium, and a computer system for data collection and distribution are provided. The method may include receiving an electronic request for data from a data provider, wherein the request includes one or more characteristics of the client device. The method may also include identifying, as a function of the characteristics of the client device, a data set to be returned to the client in fulfillment of the request. The method may also include determining whether a cache of the data collector contains data sufficient to create the data set. The method may also include collecting, in response to determining that the cache does not contain data sufficient to create the data set, data from the data provider that is sufficient to create the data set. The method may also include providing the data set to the client device.

7 Claims, 3 Drawing Sheets

(56) References Cited

U.S. PATENT DOCUMENTS

| | | |
|---|---|---|
| 2005/0288083 A1 | 12/2005 | Downs, III |
| 2009/0313082 A1 | 12/2009 | Mehta et al. |
| 2010/0114864 A1 | 5/2010 | Agam et al. |
| 2011/0099109 A1* | 4/2011 | Karlsson ............ G06Q 20/40 705/44 |
| 2011/0131224 A1* | 6/2011 | Bodin ............... G06Q 30/02 707/758 |
| 2011/0302324 A1 | 12/2011 | Karaoguz et al. |
| 2013/0219024 A1* | 8/2013 | Flack ............. H04L 67/2804 709/219 |
| 2013/0318191 A1* | 11/2013 | Yin .................. H04L 69/28 709/213 |
| 2014/0310398 A1* | 10/2014 | Zhou ................. H04L 43/08 709/224 |

OTHER PUBLICATIONS

"Standard way to detect mobile browsers in a web application based on the http request" http://stackoverflow.com/questions/142273/standard-way-to-detect-mobile-browsers-in-a-web-application-based-on-the-http-re/169402#169402.

* cited by examiner

DATA COLLECTION AND DISTRIBUTION MANAGEMENT

TECHNICAL FIELD

The present invention relates to the field of computer systems, and more specifically, to computer systems that collect data and provide subsets of that data.

BACKGROUND

Computer systems typically include a combination of computer programs and hardware, such as semiconductors, transistors, chips, circuit boards, storage devices, and processors. The computer programs are stored in the storage devices and are executed by the processors. Computer systems are often used to collect and distribute data. This data may be collected from a variety of sources. The data may also be categorized into subsets and provided in response to various data requests.

SUMMARY

According to embodiments of the invention, a method, a computer readable storage medium, and a computer system for data collection and distribution management are provided. The method may include receiving, from a client device, an electronic request for data from a data provider, wherein the request includes one or more characteristics of the client device. The method may also include identifying, as a function of the one or more characteristics of the client device, a data set to be returned to the client in fulfillment of the request. The method may also include determining whether a cache of the data collector contains data sufficient to create the data set. The method may also include collecting, in response to determining that the cache does not contain data sufficient to create the data set, data from the data provider that is sufficient to create the data set. The method may also include providing the data set to the client device.

DETAILED DESCRIPTION

Consistent with embodiments discussed herein, modern computer systems may produce or contain data that may be provided in response to requests from other computer systems or devices. For instance, a computer system may include one or more components that are designed to provide performance metrics for a computer. Such a component, from which data is requested, is hereafter referred to as the data provider. The computer system can also include a data collector, which can be implemented from a combination of hardware and software. This data collector may collect data from the data provider and provide the data in response to data requests, thereby operating as the interface between the data provider and any outside system, such as a client device, which may request data. The data collector may also include a cache which stores data from the data provider which may be used to fulfill a data request. In certain instances, the data collector responds to a data request by refreshing all the data within the cache for a data request, and then providing the data to the requesting client device. Since this process responds to each data request individually by refreshing all of the data within the cache, the process becomes increasingly inefficient as more data requests are submitted to the data collector from various client devices. This inefficiency may result from a combination of collecting the same data multiple times for multiple client devices, and collecting more data than may be necessary to fulfill each individual request.

Embodiments of the present invention are directed towards a system for providing data based on characteristics of the client device. This system may include a data collector that is configured to identify a data set to be returned to each client device in response to a data request submitted to the data collector by each client device. The identification of the data set may be based on metadata tags provided within the data request. These metadata tags may include information regarding client device characteristics such as the client's operating system or device interface. An example is the "User-Agent" header field of the Hypertext Transfer Protocol (HTTP/1.1), which may provide information about the client's web browser and operating system to an HTTP server. Once the data set is identified the data collector may assemble the data set from data that has previously been collected from the data provider and stored in the cache of the data collector. If the cache does not contain the data required to assemble the data set, the data collector may then collected additional data from the data provider and use it to assemble the data set.

Figure 1:
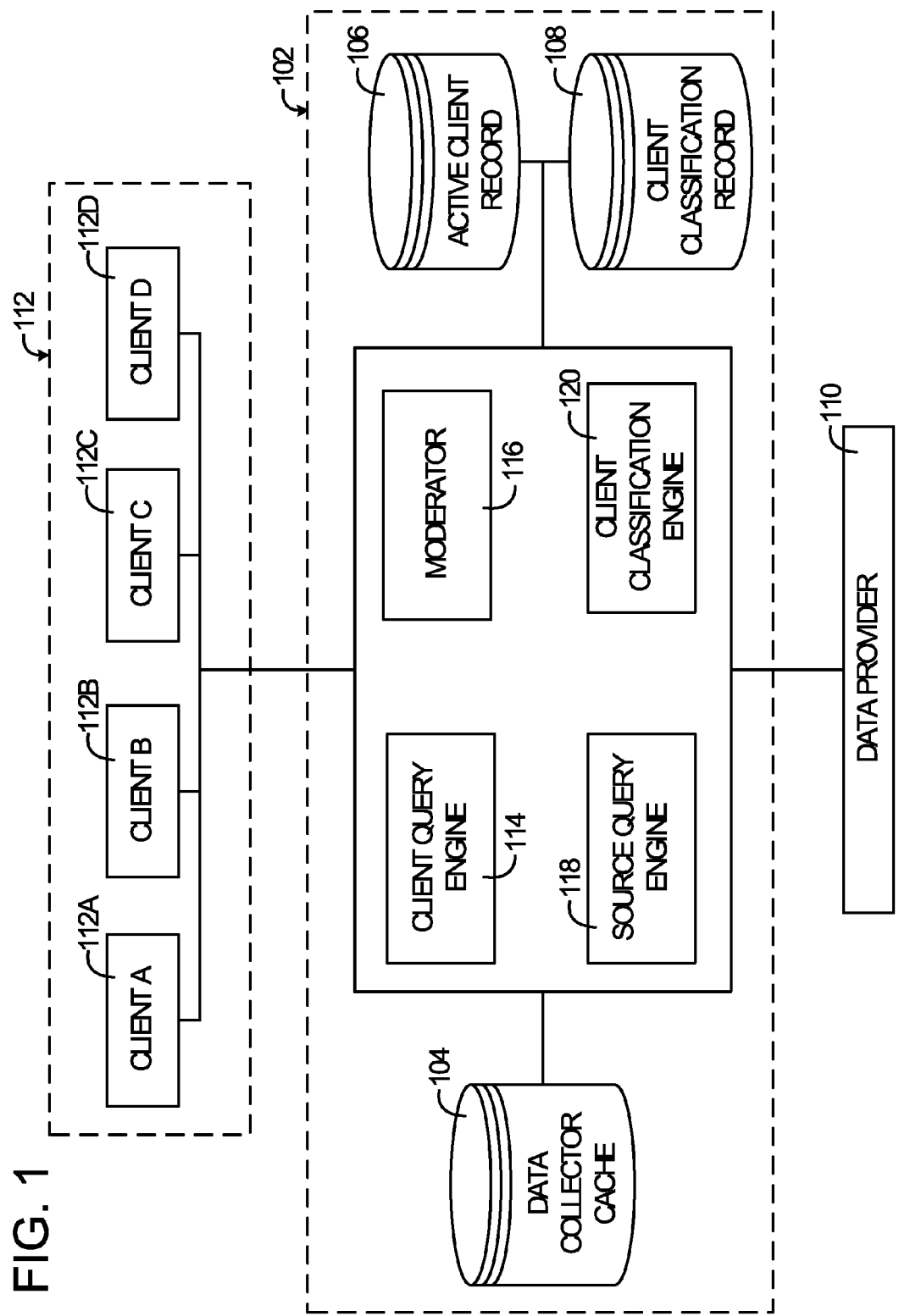
FIG. 1 depicts a high-level block diagram representation of a system for data collection and distribution management, according to an embodiment of the present invention.

Referring to the drawings, wherein like numbers denote like parts throughout the several views, FIG. 1 depicts a high-level block diagram representation of a data collector 102 for data collection and distribution management, according to an embodiment of the present invention. As previously mentioned, the data collector 102 may be implemented by any combination of hardware and software. In various embodiments, the data collector 102 may be implemented by software running on a computer system such as a server. In other embodiments, the data collector 102 may be a separate computer system consisting of hardware and software separate from any other system, and connected to various other systems through a network.

The data collector 102 may include a data collector cache 104, an active client record 106, and a client classification record 108. The data collector 102 may collect data from a data provider 110. The data provider 110 may be any computer system that may provide data. In various embodiments, the data provider 110 may be a relatively simple source such as a single component of a single computer system. In other embodiments, the data provider 110 may be a relatively complex source consisting of multiple computer systems connected through a network. An example of a data provider 110 may be a server used in production within a company. The data the server provides may be performance data which shows how well the system performs. If this system were to receive multiple requests for data from multiple sources it may adversely affect the performance of the system. The data collector 102 may alleviate the adverse affects on the performance of this system by managing the data requests.

With continued reference to FIG. 1, the data collector 102 may also respond to data requests from one or more client devices 112A, 112B, 112C, and 112D, herein collectively referred to as the client devices 112. A client device may be any combination of hardware and software capable of communicating electronically with the data collector 102. The data collector cache 104 may store data collected from the data provider 110. The active client record 106 may store information related to client devices 112 for whom the data collector 102 is actively collecting data. This information may include the characteristics of the client devices 112 included in the metadata as well as information regarding the requested data. The client classification record 108 may store information related to classifying client devices 112 based on metadata collected from them. This information may include client classification rules, the information from the metadata from the client devices 112, and any results from applying the client classification rules to the metadata.

With continued reference to FIG. 1, the data collector 102 may also contain a client query engine 114, a moderator 116, a source query engine 118, and a client classification engine 120. The client query engine 114 may be responsible for responding to a data request from the client devices 112. This response may be tailored to each individual client device 112A, 112B, 112C and 112D according to metadata provided within the client's request. An example of the metadata may be the previously stated "User-Agent" header field of the Hypertext Transfer Protocol (HTTP/1.1). This metadata may be used to classify each individual client device 112A, 112B, 112C and 112D as a particular client type by comparing the metadata of the respective client device 112A, 112B, 112C and 112C to the client classification rules of the client classification record 108. This metadata may also be used to identify the data set that is to be returned to the client device 112 in response to the data request. The moderator 116 may coordinate the other components of the data collector 102. The moderator 116 may also manage the active client record 106 in order to keep track of all the client devices 112 which are actively requesting data. The source query engine 118 may gather data from the data provider 110 and store it in the data collector cache 104. The source query engine 118 may also construct queries for the data provider 110 that only gather the data required for the currently active client devices 112 as determined from the active client record 106.

With continued reference to FIG. 1, the client classification engine 120 may classify the client devices 112. This classification may be done upon receipt of a data request from an individual client device 112A, 112B, 112C or 112D, and evaluation of metadata from the request using a set of client classification rules. An example of client classification rules may be to assign a value, such as a weight or score, to various characteristics of the client device 112. The characteristics may include the operating system of the client device 112, the memory of the client device 112, and a type of display of the client device 112. The values may be combined to represent, for example, the capacity of the client device 112 to store, process, or render the data requested. These values may then be used to determine the data set which may be returned to the client device 112 in response to the data request. For example, a request for data may come from a client device 112 which is a smart phone. The operating system of the smart phone may be weighted at a four out of ten, the hardware may be weighted at a three, and the type of display at a two. One way in which these weights might be combined is to calculate a simple average. In this example, the simple average of the weights is three, and it may be determined that the data set returned to the client device 112 may be limited to thirty percent of the available data, such as the data available in the data collector cache 104. Numerous other combinations and resulting data manipulations could be made in accordance with the invention. In other embodiments, the data being collected may be classified by level of importance. This classification may allow the data which is classified as more important to be given priority when the quantity of returned data is limited, such as the data of the previous example.

Figure 2:
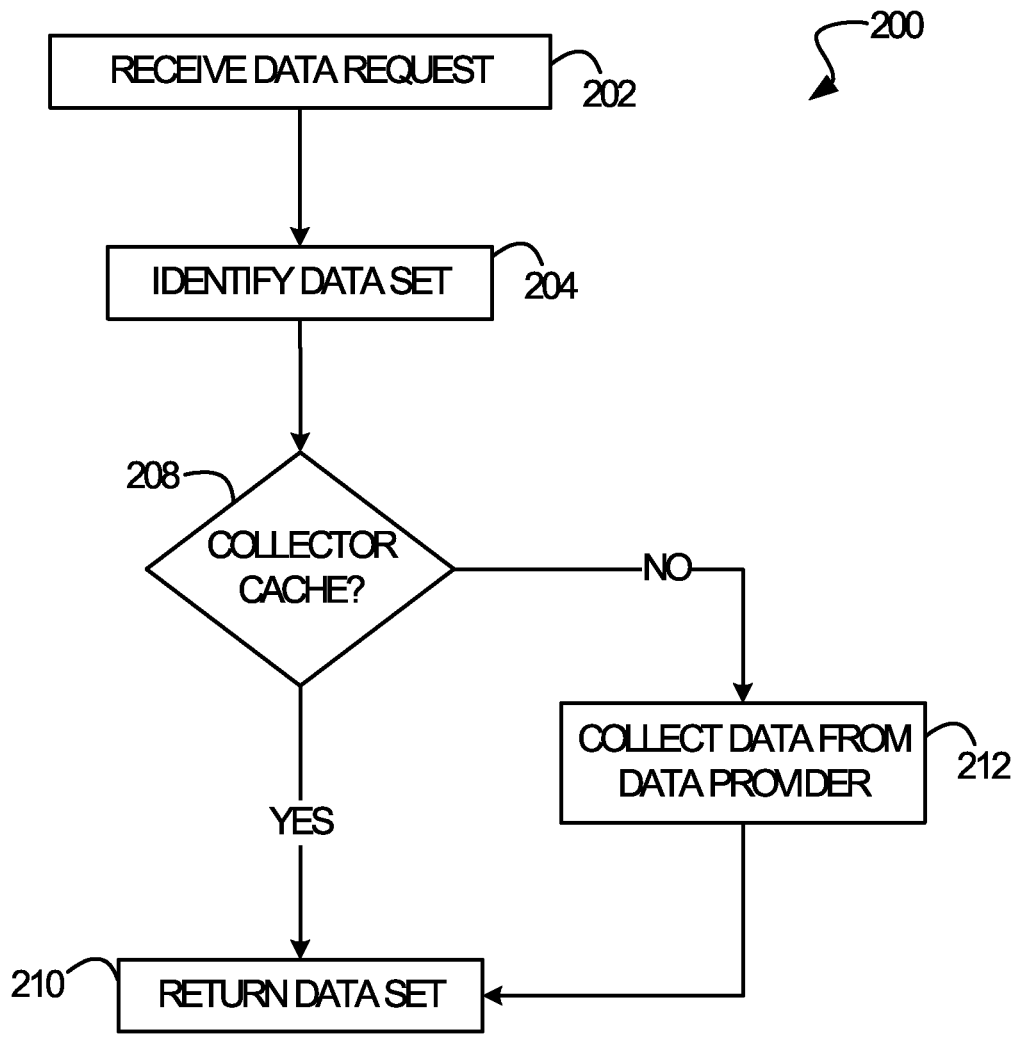
FIG. 2 depicts a flow chart of example process for data collection and distribution management, according to an embodiment of the invention.

FIG. 2 depicts a flow chart of example process 200 for data collection and distribution management, according to an embodiment of the invention. At block 202, a request for data from one of the client devices 112 may be received by the data collector 102. As previously mentioned, this request may include metadata information containing client characteristics. At block 204, the data collector 102 may identify the data set to be returned in response to the data request. The data set may be identified by classifying the client devices 112 using the metadata and a set of classification rules from the client classification record 108. This classification may use the classification rules as previously mentioned or may include any other classification rules as may be applicable to the type of client or the requested data set.

With continued reference to FIG. 2, in various embodiments, the data collector 102 may determine if a client type is currently requesting data by using a logon/logoff mechanism. This mechanism may increment a counter for each respective one of client devices 112 of a particular client type upon each logon, and decrement the counter when each respective one of client devices 112 logs off. If the counter is not zero then one or more client devices 112 have an active logon. However, if the counter is zero, then there is currently no request for data from that client type and the data collector 102 may remove the data for that client type from the data collector cache 104 or stop querying it from the data provider 110. In other embodiments, the data collector 102 may determine the fulfillment of a data request by using a time-out strategy. Whenever one of the client devices 112 of a particular client type submits a request for data, a time stamp for the request may be saved in relation to the client type. It may be noted that it may only be necessary to save the time stamp of the latest request for this client type. On a regular basis the data collector 102 may check this saved time stamp for all the known client types. If the amount of time since this time stamp exceeds a specified amount or threshold, then the data collector 102 may determine that the client type is currently inactive and therefore no data request is currently active. The data collector 102 may remove the data for that client type from the data collector cache 104 or stop querying it from the data provider 110.

With continued reference to FIG. 2, at block 208, a deciding operation determines if the data present in the data collector cache 104 is sufficient to create the data set. This determination may be done when the source query engine 118 checks the data collector cache 104 for data. If the data collector cache 104 contains sufficient data to fulfill the data request, then the process moves to block 210. At block 210, the data set may be returned to the client device 112. Returning to block 208 if the data collector cache 104 does not contain enough data to fulfill the data request, then the process moves to block 212. At block 212, the source query engine 118 queries the data provider 110 for the necessary data required to create the data set. Once the necessary data has been collected the process moves to block 210 where the data set may be returned to the client devices 112.

Figure 3:
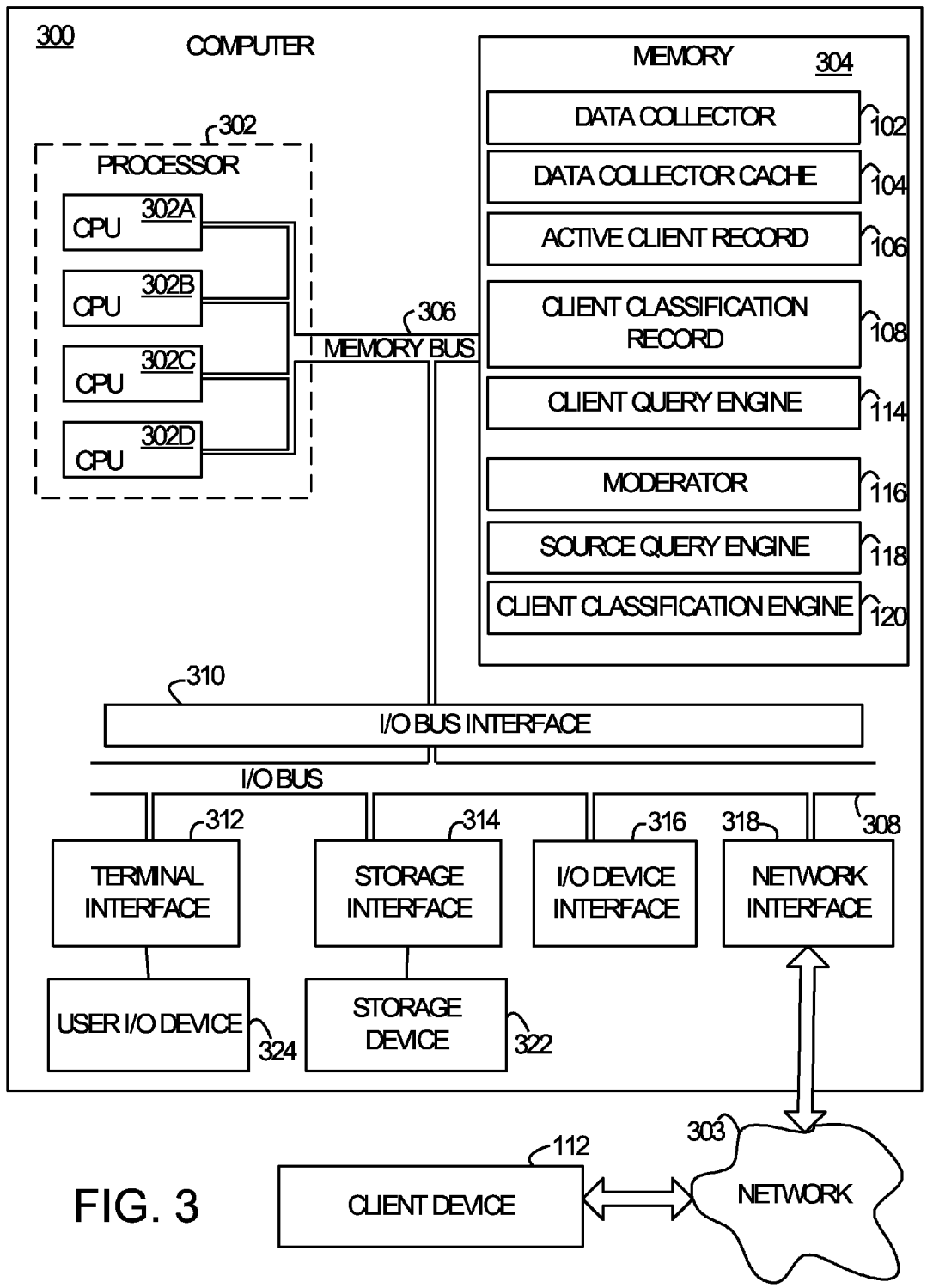
FIG. 3 depicts a high-level block diagram of an exemplary computer system for implementing an embodiment of the invention.

FIG. 3 depicts a high-level block diagram of an exemplary computer system 300 for implementing an embodiment of the invention. The computer system 300 may be connected to a client device 112 via a network 303, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system. The major components of the computer system 300 comprise one or more processors 302, a main memory 304, a terminal interface 312, a storage interface 314, an I/O (Input/Output) device interface 316, and a network interface 318, all of which are communicatively coupled, directly or indirectly, for inter-component communication via a memory bus 306, an I/O bus 308, and an I/O bus interface unit 310.

With continued reference to FIG. 3, the computer system 300 contains one or more general-purpose programmable central processing units (CPUs) 302A, 302B, 302C, and 302D, herein generically referred to as the processor 302. In an embodiment, the computer system 300 contains multiple processors typical of a relatively large system; however, in another embodiment the computer system 300 may alternatively be a single CPU system. Each processor 302 executes instructions stored in the main memory 304 and may comprise one or more levels of on-board cache.

With continued reference to FIG. 3, in an embodiment, the main memory 304 may comprise a random-access semiconductor memory, storage device, or storage medium (either volatile or non-volatile) for storing or encoding data and programs. In another embodiment, the main memory 304 represents the entire virtual memory of the computer system 300, and may also include the virtual memory of other computer systems coupled to the computer system 300 or connected via a network. The main memory 304 is conceptually a single monolithic entity, but in other embodiments the main memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

With continued reference to FIG. 3, the main memory 304 may store all or a portion of the following: a data collector 102, a data collector cache 104, an active client record 106, a client classification record 108, a client query engine 114, a moderator 116, a source query engine 118, and a client classification engine 120, hereafter collectively referred to as "stored programs and data." Although the stored programs and data are illustrated as being contained within the memory 304 in the computer system 300, in other embodiments some or all of them may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, while stored programs and data are illustrated as being contained within the main memory 304, these components are not necessarily all completely contained in the same storage device at the same time. Further, although the stored programs and data are illustrated as being separate entities, in other embodiments some of them, portions of some of them, or all of them may be packaged together.

With continued reference to FIG. 3, in an embodiment, the stored programs and data comprise instructions or statements that execute on the processor 302 or instructions or statements that are interpreted by instructions or statements that execute on the processor 302, to carry out the functions as further described with reference to FIGS. 1 and 2. In another embodiment, the stored programs and data are implemented in hardware via semiconductor devices, chips, logical gates, circuits, circuit cards, and/or other physical hardware devices in lieu of, or in addition to, a processor-based system. In an embodiment, the stored programs and data comprise data in addition to instructions or statements.

With continued reference to FIG. 3, the memory bus 306 provides a data communication path for transferring data among the processor 302, the main memory 304, and the I/O bus interface 310. The I/O bus interface 310 is further coupled to the I/O bus 308 for transferring data to and from the various I/O units. The I/O bus interface unit 310 communicates with multiple I/O interface units 312, 314, 316, and 318, which are also known as I/O processors (IOPs) or I/O adapters (IOAs), through the I/O bus 308.

With continued reference to FIG. 3, the I/O interface units support communication with a variety of storage and I/O devices. For example, the terminal interface unit 312 supports the attachment of one or more user I/O devices 320, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 320 and the computer system 300, and may receive output data via the user output devices. For example, a user interface may be presented via the user I/O device 320, such as displayed on a display device, played via a speaker, or printed via a printer.

With continued reference to FIG. 3, the storage interface 314 supports the attachment of one or more disk drives or direct access storage devices 322 (which are typically rotating magnetic disk drive storage devices, although they could alternatively be other storage devices, including arrays of disk drives configured to appear as a single large storage device to a host computer). In another embodiment, the storage device 322 may be implemented via any type of secondary storage device. The contents of the main memory 304, or any portion thereof, may be stored to and retrieved from the storage device 322, as needed. The I/O device interface 316 provides an interface to any of various other input/output devices or devices of other types, such as printers or fax machines. The network interface 318 provides one or more communications paths from the computer system 300 to other digital devices and computer systems; such paths may comprise, e.g., one or more networks.

With continued reference to FIG. 3, although the memory bus 306 is shown in FIG. 3 as a relatively simple, single bus structure providing a direct communication path among the processors 302, the main memory 304, and the I/O bus interface 310, in fact the memory bus 306 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 300 may, in fact, contain multiple I/O bus interface units 310 and/or multiple I/O buses 308. While multiple I/O interface units are shown, which separate the I/O bus 308 from various communications paths running to the various I/O devices, in other embodiments some or all of the I/O devices are connected directly to one or more system I/O buses.

With continued reference to FIG. 3, in various embodiments, the computer system 300 is a multi-user mainframe computer system, a single-user system, or a server computer or similar device that has little or no direct user interface, but receives requests from other computer systems (clients). In other embodiments, the computer system 300 is implemented as a desktop computer, portable computer, laptop or notebook computer, tablet computer, pocket computer, telephone, smart phone, or any other appropriate type of electronic device.

FIG. 3 is intended to depict the representative major components of the computer system 300. But, individual components may have greater complexity than represented in FIG. 3, components other than or in addition to those shown in FIG. 3 may be present, and the number, type, and configuration of such components may vary. Several particular examples of such additional complexity or additional variations are disclosed herein; these are by way of example only and are not necessarily the only such variations. The various program components illustrated in FIG. 3 and implementing various embodiments of the invention may be implemented in a number of manners, including using various computer applications, routines, components, programs, objects, modules, data structures, etc., and are referred to herein as "software," "computer programs," or simply "programs."

With continued reference to FIG. 3, the computer programs comprise one or more instructions or statements that are resident at various times in various memory and storage devices in the computer system 300 and that, when read and executed by one or more processors in the computer system 300 or when interpreted by instructions that are executed by one or more processors, cause the computer system 300 to perform the actions necessary to execute steps or operations comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, microcode, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the invention. But, any particular program nomenclature used herein is used merely for convenience, and thus embodiments of the invention are not limited to use solely in any specific application identified and/or implied by such nomenclature. The exemplary environments illustrated in FIG. 3 are not intended to limit the present invention. Indeed, other alternative hardware and/or program environments may be used without departing from the scope of embodiments of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A computer implemented method, comprising:
executing computer instructions on a data collector computer system to perform the steps of:
receiving, from a client device, an electronic request for data from a data provider, wherein the request includes one or more characteristics of the client device;
identifying, as a function of the one or more characteristics of the client device, a data set to be returned to the client in fulfillment of the request;
assigning a value to each of the one or more characteristics of the client device, and limiting a size of the data set in relation to a simple average of the values;
determining whether a cache of the data collector contains data sufficient to create the data set;
collecting, in response to determining that the cache does not contain data sufficient to create the data set, data from the data provider that is sufficient to create the data set;
providing the data set from the data provider to the client device;
creating, in response to receiving the electronic request from the client device, a time stamp;
determining that an amount of time since the time stamp was created has exceeded a threshold;
clearing, in response to the threshold being exceeded, the data set from the cache of the data collector; and
stopping, in response to the data set being cleared from the cache of the data collector, querying data from the data provider for updating the data set.

2. A non-transitory computer readable storage medium having instructions stored thereon which, when executed, cause a processor to perform the following operations:
creating a time stamp in response to receiving a first electronic request;
receiving, from a client device, a second electronic request for data from a data provider, wherein the second request includes one or more characteristics of the client device;
identifying, as a function of the one or more characteristics of the client device, a data set to be returned to the client device in fulfillment of the second request;
creating, in response to receiving the second electronic request, a second timestamp;
determining, in response to receiving the second electronic request from the client device, that an amount of time since the time stamp was created has not exceeded a threshold;
checking, in response to determining the amount of time since the time stamp was created has not exceeded the threshold, a cache of a data collector;

determining, based on the checking the cache of the data collector, that the cache of the data collector contains data sufficient to create the data set;

collecting, in response to determining that the cache does contain data sufficient to create the data set, data from the cache of the data collector that is sufficient to create the data set;

providing the data set to the client device;

replacing the timestamp with the second timestamp;

receiving, from a second client device and after replacing the timestamp with the second timestamp, a third electronic request for data from the data provider, wherein the third request includes one or more characteristics of the second client device;

identifying, as a function of the one or more characteristics of the second client device, that the data set is to be returned to the second client device in fulfillment of the third request;

creating, in response to receiving the third electronic request, a third timestamp;

determining, in response to receiving the third electronic request from the second client device, that an amount of time since the second timestamp was created has not exceeded the threshold;

rechecking, in response to determining the amount of time since the second time stamp was created has not exceeded the threshold, the cache of the data collector;

re-determining, based on the rechecking the cache of the data collector, that the cache of the data collector contains data sufficient to create the data set;

re-collecting, in response to re-determining that the cache does contain data sufficient to create the data set, the data from the cache of the data collector that is sufficient to create the data set;

providing the data set to the second client device; and replacing the second timestamp with the third timestamp.

3. The storage medium of claim 2, wherein the characteristics of the client device include an operating system of the client device.

4. The storage medium of claim 2, wherein the characteristics of the client device include a type of hardware of the client device.

5. The storage medium of claim 2, wherein the characteristics of the client device include a type of display of the client device.

6. The storage medium of claim 2, wherein, when executed, the instructions further cause the processor to perform the following operation:

assigning a value to each of the one or more characteristics of the client device, and limiting the data set in relation to a simple average of the values.

7. A computer system including a processor and a memory encoded with instructions, wherein the instructions when executed on the processor perform the following operations:

determining, using a logon/logoff mechanism, that a first client device is logged on;

receiving, by a data collector, while the first client device is logged on, and from the first client device, a first electronic request for data from a data provider, wherein the first electronic request includes one or more characteristics of the first client device;

classifying, in response to receiving the first electronic request, the first client device into a first client type based on the one or more characteristics of the first client device;

incrementing, in response to the first client device being logged on and in response to classifying the first client device into a first client type, a first counter;

identifying, as a function of the first client type and in response to receiving the first electronic request, that a first data set is to be returned to the first client device in fulfillment of the first electronic request;

determining, in response to identifying that the first data set is to be returned to the first client device in fulfillment of the first electronic request, that the cache of the data collector contains data sufficient to create the first data set;

providing, in response to determining that the cache of the data collector contains data sufficient to create the first data set and in response to receiving the first electronic request, the first data set to the first client device from the cache;

determining, using the logon/logoff mechanism and after providing the first data set to the first client device, that the first client device is logged off;

decrementing, in response to determining the first client device is logged off, the first counter, wherein decrementing, in response to determining the first client device is logged off, the first counter does not result in the first counter being zero;

determining, based on the first counter not being zero, that the first client type has an active logon;

determining, using the logon/logoff mechanism, that a second client device is logged on;

receiving, by the data collector, while the second client device is logged on, and from the second client device, a second electronic request for data from the data provider, wherein the second electronic request includes one or more characteristics of the second client device;

classifying, in response to receiving the second electronic request, the second client device into a second client type based on the one or more characteristics of the second client device;

incrementing, in response to the second client device being logged on and in response to classifying the second client device into a second client type, a second counter;

identifying, as a function of the second client type and in response to receiving the second electronic request, that a second data set is to be returned to the second client device in fulfillment of the second electronic request;

determining, in response to identifying that the second data set is to be returned to the second client device in fulfillment of the second electronic request, that the cache of the data collector does not contain data sufficient to create the second data set;

collecting, in response to determining that the cache of the data collector does not contain data sufficient to create the second data set, data from the data provider that is sufficient to create the second data set;

providing, based on the collected data and in response to receiving the second electronic request, the second data set to the second client device;

determining, using the logon/logoff mechanism and after providing the second data set to the second client device, that the second client device is logged off;

decrementing, in response to determining the second client device is logged off, the second counter, wherein decrementing, in response to determining the second client device is logged off, the second counter results in the second counter being zero;

determining, based on the second counter being zero, that the second client type does not have an active logon;

removing, based on the second client type not having an active logon, the second data set from the cache of the data collector;

determining, using the logon/logoff mechanism, that a third client device is logged on;

receiving, by the data collector, while the third client device is logged on, after the first client device is logged off, and from the third client device, a third electronic request for data from the data provider, wherein the third electronic request includes one or more characteristics of the third client device;

classifying the third client device into the first client type based on the one or more characteristics of the third client device;

incrementing, in response to the third client device being logged on and in response to classifying the third client device into the first client type, the first counter;

identifying, as a function of the first client type and in response to receiving the third electronic request, that the first data set is to be returned to the third client device in fulfillment of the third electronic request;

determining, in response to identifying that the first data set is to be returned to the third client device in fulfillment of the third electronic request, that the cache of the data collector contains data sufficient to create the first data set;

providing, in response to determining that the cache of the data collector contains data sufficient to create the first data set and in response to receiving the third electronic request, the first data set to the third client device from the cache;

determining, using the logon/logoff mechanism and after providing the first data set to the third client device, that the third client device is logged off;

decrementing, in response to determining the third client device is logged off, the first counter, wherein decrementing, in response to determining the third client device is logged off, the first counter results in the first counter being zero;

determining, based on the first counter being zero, that the first client type does not have an active logon; and removing, based on the first client type not having an active logon, the first data set from the cache of the data collector.

* * * * *